United States Patent
Yamaguchi

(10) Patent No.: US 7,619,189 B2
(45) Date of Patent: Nov. 17, 2009

(54) IMAGING APPARATUS WITH AUTOFOCUS FUNCTION, IMAGING METHOD, STORAGE MEDIUM, AND INTEGRATED CIRCUIT

(75) Inventor: Atsushi Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/326,511

(22) Filed: Dec. 2, 2008

(65) Prior Publication Data
US 2009/0146045 A1 Jun. 11, 2009

(30) Foreign Application Priority Data
Dec. 5, 2007 (JP) .............................. 2007-314303

(51) Int. Cl.
G02B 27/40 (2006.01)
(52) U.S. Cl. ............... 250/201.2; 250/201.4; 250/201.7
(58) Field of Classification Search .............. 250/201.2, 250/201.3, 201.4, 201.7, 216, 214 R; 359/368, 359/379; 356/609, 624
See application file for complete search history.

(56) References Cited
U.S. PATENT DOCUMENTS
2005/0068453 A1 3/2005 Sasakura
2005/0258335 A1* 11/2005 Oshiro et al. ............ 250/201.3

FOREIGN PATENT DOCUMENTS
JP 8-50227 2/1996
JP 2000-330012 11/2000
JP 2005-106962 4/2005

* cited by examiner

*Primary Examiner*—Kevin Pyo
(74) *Attorney, Agent, or Firm*—Wenderoth, Lind & Ponack, L.L.P.

(57) ABSTRACT

An imaging apparatus executes AF control without affecting a video signal and prevents video signal qualities in an in-focus state from decreasing. An optical path separation unit 2 separates light from a subject into first and second light beams. A first imaging unit 3 generates a first signal using the first beam. A second imaging unit 7 generates a second signal using the second beam. A control unit 14 generates a contrast evaluation value based on the second signal while changing an optical-path length of the second light beam by back-or-fourth moving the AF-purpose imaging unit 7 and detects a maximum contrast evaluation value, and executes focus control over an optical system 1 based on the optical-path length corresponding to the detected value. An imaging-purpose signal generation unit 15 generates an imaging-purpose video signal using only the first signal in an out-of-focus state, and using the first and second signals in an in-focus state.

6 Claims, 6 Drawing Sheets

IMAGING APPARATUS WITH AUTOFOCUS FUNCTION, IMAGING METHOD, STORAGE MEDIUM, AND INTEGRATED CIRCUIT

This application claims priority to Japanese Patent Application No. 2007-314303 filed on Dec. 5, 2007. The entire disclosure of Japanese Patent Application No. 2007-314303 filed on Dec. 5, 2007, is hereby incorporated herein by reference.

BACKGROUND OF THE INVENTION

1. Field of the Invention

The present invention relates to an imaging apparatus with an autofocus function that automatically focuses on a subject, an imaging method, a program, and an integrated circuit.

2. Description of the Related Art

A multiple-sensor structure imaging apparatus using a color-separating prism is one example of a conventional imaging apparatus, such as a video camera. Such an imaging apparatus has a branch optical path from which a light beam is emitted, in addition to optical paths for light beams into which the incident light is split according to colors. To generate a signal that is used to focus an imaging lens, which is mounted on the camera body, the imaging apparatus includes an image sensor on the light emitting surface of the branch optical path. A driving means moves an element arranged on the light emitting surface of the branch optical path in the optical axis direction to enable the autofocus (hereafter referred to as "AF") function of the imaging apparatus (see, for example, Patent Citation 1). The imaging apparatus with the AF function has three optical-path channels respectively for a blue light beam, a red light beam, and a green light beam, into which light entering through the lens is divided according to the colors, and additionally has another optical-path channel for a light beam separated from the green light beam. The three optical-path channels are used to obtain a color video signal. The branch optical path is used to obtain a focal point detection signal. The imaging apparatus with this structure can automatically adjust an "in-focus" position by moving the image sensor arranged for focal point detection along the optical axis and using the branch optical path that does not affect a video signal. When detecting an in-focus position using a video signal generated for imaging-purpose, an imaging apparatus usually performs a wobbling operation of slightly moving its focus lens back and forth. In this case, the imaging apparatus has only a limited capability in detecting an in-focus position because the imaging apparatus is required to minimize effects of the in-focus position detection on a video signal. However, the above-described imaging apparatus with the AF function can detect an in-focus position without affecting a video signal, and therefore can detect an in-focus position with a higher precision. Also, the above-described imaging apparatus with the AF function can employ various methods for detecting an in-focus position.

Patent Citation 1: Japanese Unexamined Patent Publication No. H8-50227

DISCLOSURE OF INVENTION

Technical Problem

However, the conventional imaging apparatus described above uses a separated portion of the light entering through the lens to detect the focal point. The use of the light portion to detect the focal point would reduce the amount of light entering the image sensors arranged for imaging-purpose. This would lower the image qualities of a video signal obtained by the conventional imaging apparatus, such as the resolution and the signal-to-noise (S/N) ratio.

To solve the above conventional problem, it is an object of the present invention to enable AF control that does not affect a video signal and also prevents image qualities, such as the resolution and the S/N ratio, in an in-focus state from decreasing.

Technical Solution

A first aspect of the present invention provides an imaging apparatus including an optical system, an optical path separation unit, a first imaging unit, a second imaging unit, an optical-path length changing unit, a control unit, and an imaging-purpose signal generation unit.

The optical system focuses light from a subject. Focus control is executed over the optical system. The optical path separation unit separates the light from the subject focused by the optical system into at least a first light beam and a second light beam.

The first imaging unit includes an image sensor, and converts the first light beam to an electric signal and outputs the electric signal as a first signal. The second imaging unit includes an image sensor, and converts the second light beam to an electric signal and outputs the electric signal as a second signal. The optical-path length changing unit changes an optical-path length of the second light beam by moving the second imaging unit along an optical axis of the second light beam. The control unit generates a contrast evaluation value of the second signal output from the second imaging unit while controlling the optical-path length changing unit to change the optical-path length of the second light beam, and detects, as a contrast-evaluation-value maximizing optical-path length, an optical-path length of the second light beam corresponding to a maximum contrast evaluation value, and executes focus control over the optical system based on the contrast-evaluation-value maximizing optical-path length and outputs focus-state information indicating an in-focus state. The imaging-purpose signal generation unit generates a video signal for imaging-purpose using the first signal and the second signal when the focus-state information indicates an in-focus state, and generates a video signal for imaging-purpose using the first signal and without using the second signal when the focus-state information indicates an out-of-focus state.

This imaging apparatus detects an in-focus position using the second signal obtained by the second imaging unit during an AF operation. Therefore, the in-focus position detection has no unfavorable effect on an imaging-purpose video signal. After the AF operation is completed and the imaging apparatus is in focus (in an in-focus state), the imaging apparatus generates an imaging-purpose video signal using not only the first signal but also the second signal. This prevents the image qualities of an image formed by the imaging apparatus, such as the resolution and the S/N ratio, from decreasing.

A second aspect of the present invention provides the imaging apparatus of the first aspect of the present invention in which the image sensor of the second imaging unit is arranged at a position shifting in a horizontal direction on a surface of the image sensor by a distance corresponding to half a pixel from a position optically equivalent to a position of the image sensor of the first imaging unit. When the focus-state information indicates an in-focus state, the imaging-purpose signal generation unit generates the imaging-purpose video signal using the first signal and the second signal with a clock having a frequency twice a frequency of a clock used when processing only the first signal.

In this imaging apparatus, when the focus-state information indicates an in-focus state, the signal processing unit 6 generates an imaging-purpose video signal through signal processing according to, for example, a dual-green technique (when the first signal and the second signal are G-element signals), which is the processing for outputting a video signal with a doubled clock rate using the first signal and the second signal (signal with a phase different from the first signal). When the focus-state information does not indicate an in-focus state, the signal processing unit generates an imaging-purpose video signal through ordinary signal processing (signal processing using the same clock as when processing only the first signal).

As a result, the imaging apparatus eliminates unfavorable effects of the in-focus position detection, or more specifically prevents the in-focus position of an imaging-purpose video signal from changing while the imaging apparatus is operating under the autofocus control. Also, the imaging apparatus uses an autofocus control signal (second signal) after the imaging apparatus is in focus, and improves the resolution and the S/N ratio of an imaging-purpose video signal.

A third aspect of the present invention provides the imaging apparatus of the first aspect of the present invention in which the image sensor of the second imaging unit is arranged at a position optically equivalent to a position of the image sensor of the first imaging unit. When the focus-state information indicates an in-focus state, the imaging-purpose signal generation unit generates the imaging-purpose video signal by adding the first signal and the second signal.

In this imaging apparatus, the signal processing unit performs addition to use an autofocus control signal (second signal) after the imaging apparatus is in focus. This improves the resolution and the S/N ratio of an imaging-purpose video signal, and in particular, enables the S/N ratio of an imaging-purpose video signal to be maintained high after the imaging apparatus is in focus.

A fourth aspect of the present invention provides an imaging method used in an imaging apparatus including an optical system that focuses light from a subject and over which focus control is executed, an optical path separation unit that separates the light from the subject focused by the optical system into at least a first light beam and a second light beam, a first imaging unit that includes an image sensor, and converts the first light beam to an electric signal and outputs the electric signal as a first signal, a second imaging unit that includes an image sensor, and converts the second light beam to an electric signal and outputs the electric signal as a second signal, and an optical-path length changing unit that changes an optical-path length of the second light beam by moving the second imaging unit along an optical axis of the second light beam. The imaging method includes a control process and an imaging-purpose signal generation process.

In the control process, a contrast evaluation value of the second signal output from the second imaging unit is generated while the optical-path length of the second light beam is changed by moving the second imaging unit along the optical axis of the second light beam, and an optical-path length of the second light beam corresponding to a maximum contrast evaluation value is detected as a contrast-evaluation-value maximizing optical-path length, and focus control is executed over the optical system based on the contrast-evaluation-value maximizing optical-path length and focus-state information indicating an in-focus state is output. In the imaging-purpose signal generation process, a video signal for imaging-purpose is generated using the first signal and the second signal when the focus-state information indicates an in-focus state, and a video signal for imaging-purpose is generated using the first signal and without using the second signal when the focus-state information indicates an out-of-focus state.

The imaging method has the same advantageous effects as the imaging apparatus of the first aspect of the present invention.

A fifth aspect of the present invention provides a storage medium storing a program that enables a computer to implement an imaging method used in an imaging apparatus including an optical system that focuses light from a subject and over which focus control is executed, an optical path separation unit that separates the light from the subject focused by the optical system into at least a first light beam and a second light beam, a first imaging unit that includes an image sensor, and converts the first light beam to an electric signal and outputs the electric signal as a first signal, a second imaging unit that includes an image sensor, and converts the second light beam to an electric signal and outputs the electric signal as a second signal, and an optical-path length changing unit that changes an optical-path length of the second light beam by moving the second imaging unit along an optical axis of the second light beam. The imaging method includes a control process and an imaging-purpose signal generation process.

In the control process, a contrast evaluation value of the second signal output from the second imaging unit is generated while the optical-path length of the second light beam is changed by moving the second imaging unit along the optical axis of the second light beam, and an optical-path length of the second light beam corresponding to a maximum contrast evaluation value is detected as a contrast-evaluation-value maximizing optical-path length, and focus control is executed over the optical system based on the contrast-evaluation-value maximizing optical-path length and focus-state information indicating an in-focus state is output. In the imaging-purpose signal generation process, a video signal for imaging-purpose is generated using the first signal and the second signal when the focus-state information indicates an in-focus state, and a video signal for imaging-purpose is generated using the first signal and without using the second signal when the focus-state information indicates an out-of-focus state.

The storage medium storing the program that enables a computer to execute the imaging method has the same advantageous effects as the imaging apparatus of the first aspect of the present invention.

A sixth aspect of the present invention provides an integrated circuit used in an imaging apparatus including an optical system that focuses light from a subject and over which focus control is executed, an optical path separation unit that separates the light from the subject focused by the optical system into at least a first light beam and a second light beam, a first imaging unit that includes an image sensor, and converts the first light beam to an electric signal and outputs the electric signal as a first signal, a second imaging unit that includes an image sensor, and converts the second light beam to an electric signal and outputs the electric signal as a second signal, and an optical-path length changing unit that changes an optical-path length of the second light beam by moving the second imaging unit along an optical axis of the second light beam. The integrated circuit includes a control unit and an imaging-purpose signal generation unit.

The control unit generates a contrast evaluation value of the second signal output from the second imaging unit while changing the optical-path length of the second light beam by moving the second imaging unit along the optical axis of the second light beam, and detects, as a contrast-evaluation-value maximizing optical-path length, an optical-path length of the second light beam corresponding to a maximum contrast evaluation value, and executes focus control over the optical system based on the contrast-evaluation-value maximizing optical-path length and outputs focus-state information indicating an in-focus state. The imaging-purpose signal generation unit generates a video signal for imaging-purpose using the first signal and the second signal when the focus-state information indicates an in-focus state, and generates a video signal for imaging-purpose using the first signal and without using the second signal when the focus-state information indicates an out-of-focus state.

The integrated circuit has the same advantageous effects as the imaging apparatus of the first aspect of the present invention.

Advantageous Effects

The present invention enables AF control to be executed without affecting a video signal, and also prevents image qualities, such as the resolution and the S/N ratio, in an in-focus state from decreasing.

Figure 1:
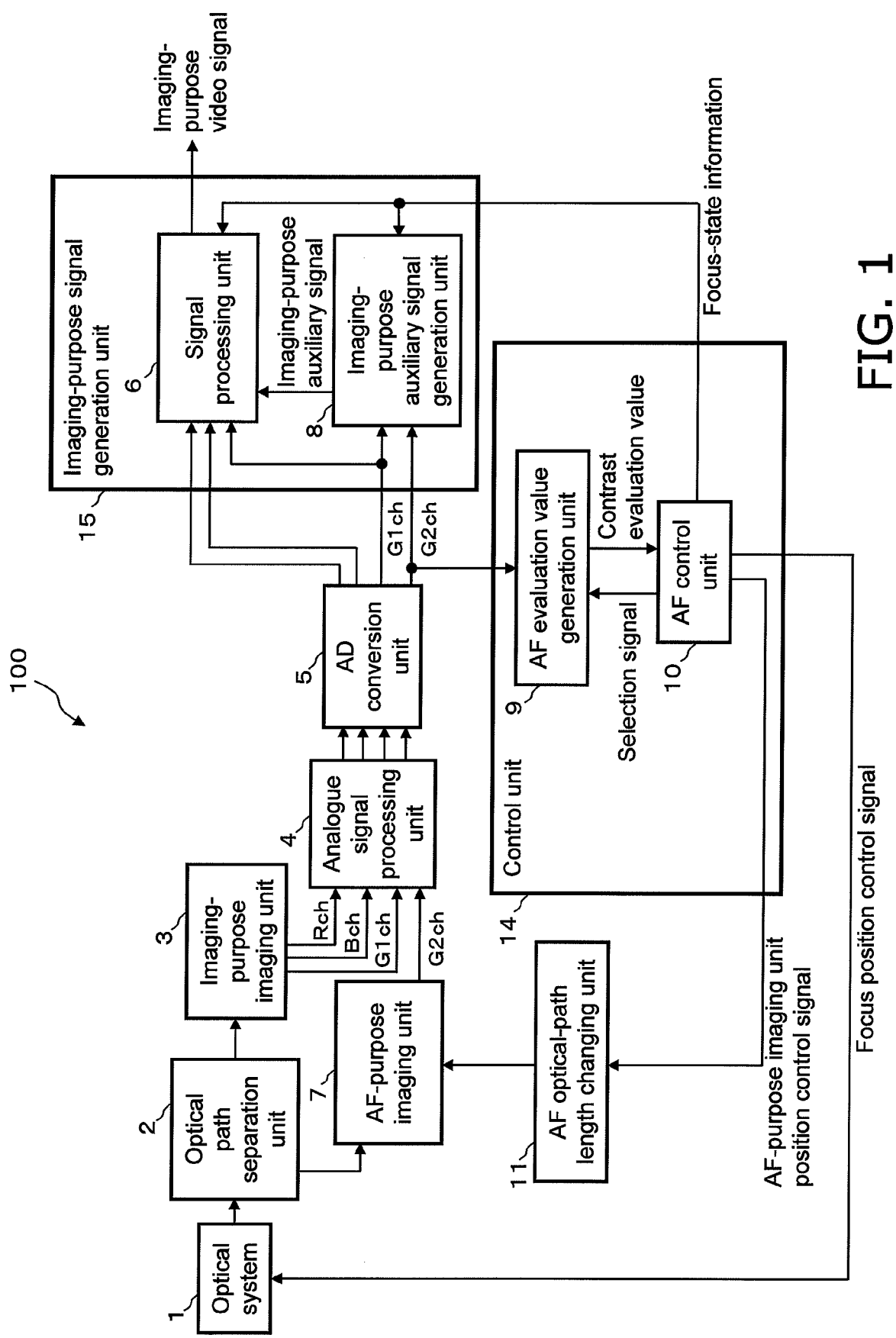
FIG. 1 is a block diagram showing the structure of an imaging apparatus with an autofocus function according to a first embodiment of the present invention.

EXPLANATION OF REFERENCE 1 optical system
2 optical path separation unit
3 imaging-purpose imaging unit (first imaging unit)
4 analogue signal processing unit (second signal processing unit)
5 AD conversion unit
6 signal processing unit
7 AF-purpose imaging unit (second imaging unit)
8 imaging-purpose auxiliary signal generation unit
9 AF evaluation value generation unit (evaluation value generation unit)
10 AF control unit
11 AF optical-path length changing unit (optical-path length changing unit)
12 AF-purpose imaging unit (second imaging unit: same phase)
13 signal processing unit (G1 and G2 addition type)
101 horizontal low-pass filter
102 first horizontal high-pass filter
103 second horizontal high-pass filter
104 vertical high-pass filter
105, 106, 107 accumulation unit
108 adder
109 selector

BEST MODE FOR CARRYING OUT THE INVENTION

Embodiments of the present invention will now be described with reference to FIGS. 1 to 6.

FIRST EMBODIMENT 1.1 Structure of the Imaging Apparatus

FIG. 1 is a block diagram showing the structure of an imaging apparatus 100 with an AF function according to a first embodiment of the present invention.

As shown in FIG. 1, the imaging apparatus 100 with the AF function includes an optical system 1, an optical path separation unit 2, an imaging-purpose imaging unit 3, an analogue signal processing unit 4, an AD conversion unit 5, an imaging-purpose signal generation unit 15, an AF-purpose imaging unit 7, a control unit 14, and an AF optical-path length changing unit 11.

The optical system 1 focuses light from a subject, and can adjust the focal length (focus position) of the light (light beam) from the subject. In other words, focus control can be executed over the optical system 1. Focus control over the optical system 1 is executed based on a focus position control signal output from the control unit 14. The optical system 1 outputs the focused light (light beam) from the subject to the optical path separation unit 2. The optical system 1 may include a plurality of lenses, and may include a focus control lens over which focus control is executed (or a lens unit including a plurality of lenses). Alternatively, the focus control over the optical system 1 may be executed by moving the focus control lens. Also, the optical system 1 may include, for example, an exchangeable lens.

The optical path separation unit 2 receives a light beam output from the optical system 1, and separates the received light beam into light beams used for imaging-purpose and a light beam used for AF-purpose. More specifically, the optical path separation unit 2 separates the light beam output from the optical system 1 into a red (R) light beam, a green-1 (G1) light beam, and a blue (B) light beam, which are imaging-purpose light beams used for imaging-purpose and serve as a first light beam, and a green-2 (G2) light beam, which is an AF detection light beam used for AF detection and serves as a second light beam. The optical path separation unit 2 then outputs the imaging-purpose light beams to the imaging-purpose imaging unit 3, which serves as a first imaging unit, and outputs the AF detection light beam to the AF-purpose imaging unit 7, which serves as a second imaging unit.

The imaging-purpose imaging unit 3 includes an image sensor, such as a complementary metal oxide semiconductor (CMOS) or a charge-coupled device (CCD). The imaging-purpose imaging unit 3 receives the imaging-purpose light beams, which are output from the optical path separation unit 2, and converts the imaging-purpose light beams to electric signals through photoelectric conversion and outputs, as analogue video signals to be transmitted on R, G1, and B channels, the resulting electric signals to the analogue signal processing unit 4.

The AF-purpose imaging unit 7 includes an image sensor, such as a CMOS or a CCD, and receives the AF detection light beam, which is output from the optical path separation unit 2. The AF-purpose imaging unit 7 converts the AF detection light beam to an electric signal, and outputs, as an analogue video signal to be transmitted on the G2 channel, the resulting electric signal to the analogue signal processing unit 4. The AF-purpose imaging unit 7 is connected to the AF optical-path length changing unit 11 in a manner that the AF-purpose imaging unit 7 is movable along the optical axis of the AF detection light beam. The image sensor of the AF-purpose imaging unit 7 is fixed at a position shifting in a horizontal direction (horizontal direction on the imaging surface of the image sensor) by a distance corresponding to half a pixel (half a pixel forming the image sensor) from a position optically equivalent to the arrangement position of the G1 image sensor of the imaging-purpose imaging unit 3. More specifically, the image sensors on the R, G1, and B channels in the four-sensor structure imaging apparatus form the imaging-purpose imaging unit 3, whereas the image sensor on the G2 channel that is movable along the optical axis forms the AF-purpose imaging unit 7. The image sensor of the AF-purpose imaging unit 7 may be fixed at a position shifting in a vertical direction or an oblique direction on the imaging surface by a distance corresponding to half a pixel from the arrangement position of the G1 image sensor of the imaging-purpose imaging unit 3.

The analogue signal processing unit 4 receives the analogue signals of the different channels output from the imaging-purpose imaging unit 3 and the AF-purpose imaging unit 7, and processes the received analogue signals through signal processing including correlated double sampling, gain control, and pedestal control. The analogue signal processing unit 4 then outputs the processed analogue signals of the different channels separately to the AD conversion unit 5.

The AD conversion unit 5 converts each signal output from the analogue signal processing unit 4 to a digital signal. The AD conversion unit 5 outputs, among the digital signals resulting from the conversion, the digital signals on the R and B channels (hereafter referred to as the "R signal" and the "B signal") to a signal processing unit 6. The AD conversion unit 5 outputs the digital signal on the G1 channel (hereafter referred to as the "G1 signal") to the signal processing unit 6 and an imaging-purpose auxiliary signal generation unit 8 included in the imaging-purpose signal generation unit 15. The AD conversion unit 5 also outputs the digital signal on the G2 channel (hereafter referred to as the "G2 signal") to the imaging-purpose auxiliary signal generation unit 8 included in the imaging-purpose signal generation unit 15 and an AF evaluation value generation unit 9 included in the control unit 14.

The control unit 14 includes the AF evaluation value generation unit 9 and an AF control unit 10.

The AF evaluation value generation unit 9 receives the G2 signal as the AF-purpose video signal, which is output from the AD conversion unit 5, and calculates a contrast evaluation value based on the G2 signal, and outputs the calculated contrast evaluation value to the AF control unit 10. The contrast evaluation value is a value evaluating the AF operation performed in correspondence with various optical-path lengths that are calculated by the AF evaluation value generation unit 9 when the optical-path length from the subject to the AF-purpose imaging unit 7 is changed by moving the AF-purpose imaging unit 7, which is controlled by the AF control unit 10 of the control unit 14. The AF evaluation value generation unit 9 also receives a selection signal input from the AF control unit 10 when necessary. The selection signal determines the type of contrast evaluation value to be output from the AF evaluation value generation unit 9.

The AF control unit 10 receives a contrast evaluation value output from the AF evaluation value generation unit 9, and detects a contrast-evaluation-value maximizing optical-path length, which is an optical-path length corresponding to a maximum contrast evaluation value, based on the input contrast evaluation value. The AF control unit 10 executes focus control over the optical system 1 based on the contrast-evaluation-value maximizing optical-path length. To execute the focus control, the AF control unit 10 outputs a focus position control signal to the optical system 1. The AF control unit 10 also outputs, as focus-state information, an in-focus signal indicating an in-focus state to the imaging-purpose signal generation unit 15 when the optical system 1 is in an in-focus state. The AF control unit 10 outputs, as focus-state information, an out-of-focus signal indicating an out-of-focus state to the imaging-purpose signal generation unit 15 when the optical system 1 is in an out-of-focus state. Also, the AF control unit 10 outputs an AF-purpose imaging unit position control signal, which is used to change the optical-path length from the subject to the AF-purpose imaging unit 7 by moving the AF-purpose imaging unit 7, to the AF optical-path length changing unit 11. The AF control unit 10 also outputs a selection signal to the AF evaluation value generation unit 9 when necessary.

The imaging-purpose signal generation unit 15 receives the R, G1, G2, and B signals, and generates a video signal for imaging-purpose based on the focus-state information provided from the control unit 14. As shown in FIG. 1, the imaging-purpose signal generation unit 15 includes the signal processing unit 6 and the imaging-purpose auxiliary signal generation unit 8.

The imaging-purpose auxiliary signal generation unit 8 receives the focus-state information output from the AF control unit 10 and the G1 and G2 signals output from the AD conversion unit 5.

When the input focus-state information is an in-focus signal, the imaging-purpose auxiliary signal generation unit 8 generates an imaging-purpose auxiliary signal using the G1 and G2 signals, and outputs the generated imaging-purpose auxiliary signal to the signal processing unit. When the input focus-state information is an out-of-focus signal, the imaging-purpose auxiliary signal generation unit 8 outputs a zero signal (including no signal) or the G1 signal to the signal processing unit 6 as an imaging-purpose auxiliary signal.

The signal processing unit 6 receives the focus-state information output from the AF control unit 10, the R signal, the B signal, and the G1 signal output from the AD conversion unit 5, and the imaging-purpose auxiliary signal output from the imaging-purpose auxiliary signal generation unit 8.

When the input focus-state information is an in-focus signal (when the focus-state information indicates an in-focus state), the signal processing unit 6 generates an imaging-purpose video signal through signal processing according to a "dual-green" technique, which is the processing for outputting a video signal with a doubled clock rate using the G1 and G2 signals. When the input focus-state information is an out-of focus signal, the signal processing unit 6 generates an imaging-purpose video signal through signal processing according to a triple-sensor technique (e.g. 3CCD technology or 3CMOS technology) using the R, G1, and B signals.

The above-described structure eliminates unfavorable effects of the focus position detection, or more specifically prevents the in-focus position of an imaging-purpose video signal from changing while the imaging apparatus 100 with the AF function is performing the AF operation. Also, the imaging apparatus 100 uses the G2 signal to generate an imaging-purpose video signal after the imaging apparatus 100 is in focus, and improves the resolution and the S/N ratio of an imaging-purpose video signal.

Details

The imaging apparatus 100 of the present embodiment will now be described in more detail.

The components of the imaging apparatus 100 from the optical system 1 to the imaging units will be described first.

Figure 2:
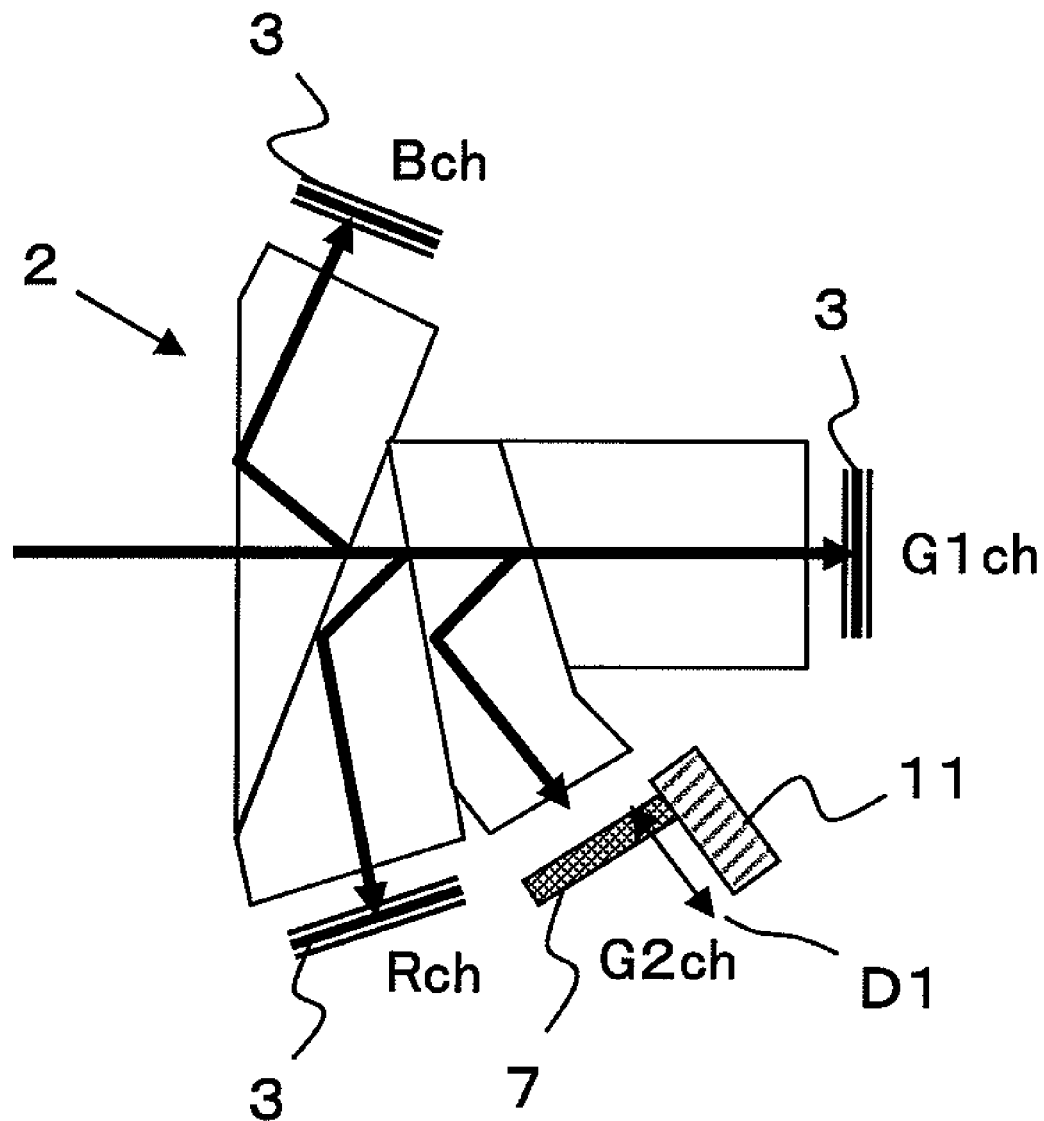
FIG. 2 is a schematic diagram describing an optical path separation unit in the first embodiment.

FIG. 2 is a schematic diagram showing one example of the structure of the optical path separation unit 2, the imaging-purpose imaging unit 3, the AF-purpose imaging unit 7, and the AF optical-path length changing unit 11. In this example, the optical path separation unit 2 is formed by an optical prism (beam splitter) as shown in FIG. 2.

As shown in FIG. 2, the optical path separation unit 2 includes a color-separating prism that is used in a four-sensor structure imaging apparatus. More specifically, a triple-sensor structure imaging apparatus divides incident light into a red (R) beam, a green (G) beam, and a blue (B) beam using a color-separating prism, whereas the optical path separation unit 2 of the present invention further separates, after the R, G, and B division, the G beam into a green-1 (G1) beam and a green-2 (G2) beam using a half mirror. More specifically, the optical path separation unit 2 outputs the G2 beam as a light beam for AF detection (an AF detection light beam), and outputs the R, G1, and B beams as light beams for imaging-purpose (imaging-purpose light beams). The percentage of the G2 beam in the G beam after the R, G, and B division may be set freely (for example, 25% or 50%). In this example, the G2 beam is assumed to be 50% of the G beam. In other words, the optical path separation unit 2 separates the G beam into halves to generate the G1 beam and the G2 beam.

As shown in FIG. 2, the imaging unit 7 for the G2 beam (AF-purpose imaging unit 7) is connected to the AF optical-path length changing unit 11, which is formed by a compact actuator. The AF optical-path length changing unit 11 moves the AF-purpose imaging unit 7 along the optical axis while maintaining the imaging surface orthogonal to the optical axis.

A substantially middle position of the range in which the AF-purpose imaging unit 7 is movable using the AF optical-path length changing unit 11 is assumed to be a reference position of the AF-purpose imaging unit 7. When the AF-purpose imaging unit 7 is at the reference position, the optical-path length from the subject to the AF-purpose imaging unit 7 is assumed to coincide with the optical-path length from the subject to the imaging-purpose imaging unit 3. The reference position may not necessarily be the middle position of the movable range of the AF-purpose imaging unit 7.

The control unit 14 will now be described in detail.

The AF control unit 10 searches for an optical-path length corresponding to a maximum contrast evaluation value using an algorithm called "hill climbing". More specifically, the AF control unit 10 sequentially changes the optical-path length of the AF-purpose imaging unit 7 (optical-path length of the light beam input into the AF-purpose imaging unit 7) using the AF optical-path length changing unit 11 while monitoring the contrast evaluation value output from the AF evaluation value generation unit 9. The AF control unit 10 also outputs a selection signal to the AF evaluation value generation unit 9 when necessary. The selection signal is used to determine which type of contrast evaluation value is to be output from the AF evaluation value generation unit 9. Based on the selection signal, the AF evaluation value generation unit 9 determines properties to be extracted from a video signal. The selection signal will be described in detail in section 1.2. The AF control unit 10 detects the optical-path length of the AF-purpose imaging unit 7 corresponding to the maximum contrast evaluation value (contrast-evaluation-value maximizing optical-path length). The AF control unit 10 also outputs focus-state information indicating whether the imaging apparatus 100 is in an in-focus state or in an out-of-focus state to the imaging-purpose signal generation unit 15.

The AF optical-path length changing unit 11 may include a linear drive motor or a stepping motor, a piezoelectric ultrasonic linear actuator that is formed using a piezoelectric element, and a sliding mechanism that slides on the optical axis. The AF optical-path length changing unit 11 can slide the AF-purpose imaging unit 7 along the optical axis (in a direction indicated by a two-headed arrow D1 in FIG. 2). The AF optical-path length changing unit 11 is controlled through, for example, serial communication.

The AF-purpose imaging unit 7 is at the reference position when the AF operation is started. The AF optical-path length changing unit 11 then sequentially moves the AF-purpose imaging unit 7 by every predetermined amount during the AF operation. The AF evaluation value generation unit 9 generates a contrast evaluation value every after moving the AF-purpose imaging unit 7 by a predetermined amount. The AF control unit 10 determines whether the imaging apparatus 100 is in focus with the current optical-path length based on the obtained contrast evaluation value. In other words, the AF control unit 10 determines whether the current optical-path length is a contrast-evaluation-value maximizing optical-path length. When the imaging apparatus 100 is in an out-of-focus state, the AF control unit 10 continues the AF operation by moving the AF-purpose imaging unit 7 further using the AF optical-path length changing unit 11.

When detecting that the optical-path length corresponding to an in-focus state, that is, when detecting the contrast-evaluation-value maximizing optical-path length, the AF control unit 10 calculates a difference between the detected optical-path length and a predetermined reference value corresponding to the optical-path length of the imaging-purpose imaging unit 3. The AF control unit 10 calculates the in-focus position of the optical system 1 based on the difference. The AF control unit 10 then executes focus control over the optical system 1 by outputting a focus position control signal for controlling the focus position of the optical system 1 to be the calculated in-focus position. More specifically, the reference position is the position of the AF-purpose imaging unit 7 at which the optical-path length of the AF-purpose imaging unit 7 coincides with the optical-path length of the light beam input into the imaging-purpose imaging unit 3. Thus, the AF control unit 10 compares the position of the AF-purpose imaging unit 7 corresponding to the detected contrast-evaluation-value maximizing optical-path length with the reference position, and calculates the in-focus position (focus position) of the optical system 1 based on the difference. The AF control unit 10 then executes focus control over the optical system 1 by, for example, moving the focus lens (or the focus lens group) based on the calculated in-focus position in a manner that the optical system 1 will be in an in-focus state.

To sum up, the imaging apparatus 100 sequentially changes the optical-path length of the AF-purpose imaging unit 7 using the AF optical-path length changing unit 11 and obtains a contrast evaluation value corresponding to each optical-path length of the AF-purpose imaging unit 7, and detects the contrast-evaluation-value maximizing optical-path length. The imaging apparatus 100 then compares the detected optical-path length with the reference position corresponding to the optical-path length of the imaging-purpose imaging unit 3, and calculates the in-focus position of the optical system 1 based on the difference, and executes focus control over the optical system 1 accordingly. The control unit 14 then finally moves the AF-purpose imaging unit 7 to the reference position using the AF optical-path length changing unit 11 for a next AF operation.

As described above, the imaging apparatus 100 detects the optical-path length corresponding to the maximum contrast evaluation value. After the focus control executed over the optical system 1, the optical system 1 is in an in-focus state, and the optical-path length of the AF-purpose imaging unit is reset to the optical-path length corresponding to the reference position. If the optical system 1 in an in-focus state becomes out of focus due to condition changes occurring when, for example, the subject moves or the imaging apparatus 100 is moved, the contrast evaluation value changes accordingly. The AF control unit 10 constantly monitors the contrast evaluation value, and detects such an out-of-focus state when the contrast evaluation value changes by a degree exceeding a predetermined threshold in an in-focus state. When detecting the out-of-focus state, the AF control unit 10 sets the focus-state information again to an out-of-focus signal. The imaging apparatus 100 repeatedly performs the AF operation described above.

The imaging-purpose signal generation unit 15 will now be described in detail.

The imaging-purpose auxiliary signal generation unit 8 receives the G1 and G2 signals from the AD conversion unit 5 and the focus-state information from the AF control unit 10. Based on the focus-state information from the AF control unit 10, the imaging-purpose auxiliary signal generation unit 8 generates an imaging-purpose auxiliary signal using the G1 and G2 signals. More specifically, when the focus-state information is an in-focus signal, the imaging-purpose auxiliary signal generation unit 8 outputs the G2 signal as an imaging-purpose auxiliary signal. When the focus-state information is an out-of-focus signal, the imaging-purpose auxiliary signal generation unit 8 outputs a zero signal (including no signal) or the G1 signal as an imaging-purpose auxiliary signal.

When the focus-state information is an in-focus signal, the signal processing unit 6 generates an imaging-purpose video signal using not only the R, G1, and B signals from the AD conversion unit 5 but also the imaging-purpose auxiliary signal (that is, the G2 signal). When the focus-state information is an out-of-focus signal, the signal processing unit 6 generates an imaging-purpose video signal using only the R, G1, and B signals from the AD conversion unit 5 and without using the imaging-purpose auxiliary signal.

More specifically, when the focus-state information is an in-focus signal, the AF signal (G2 signal) is output from the imaging-purpose auxiliary signal generation unit 8, and the signal processing unit 6 generates an imaging-purpose video signal through signal processing according to a dual-green technique, which is the processing for outputting a video signal with a doubled clock rate, by alternatively using the G2 signal and the G1 signal input as an imaging-purpose auxiliary signal. When the focus state signal is an out-of-focus signal, the signal processing unit 6 generates an imaging-purpose video signal through signal processing according to a triple-sensor technique signal using the R, G1, and B signals.

In the imaging apparatus 100 of the present embodiment described above, the image sensor of the AF-purpose imaging unit 7 is fixed at the position shifting in the horizontal direction by a distance corresponding to half a pixel from the arrangement position of the G1 image sensor of the imaging-purpose imaging unit 3. In an in-focus state, the imaging apparatus 100 therefore can perform the signal processing according to a dual-green technique. This structure of the imaging apparatus 100 prevents the resolution in an in-focus state from decreasing. The imaging apparatus with the AF function according to the present embodiment prevents the resolution in an in-focus state from decreasing, whereas a conventional imaging apparatus with an AF function would use only the G1 signal and therefore would have a lower resolution as compared with an imaging apparatus using an ordinary dual-green technique.

When the focus-state information is an out-of-focus signal, the imaging apparatus 100 generates an imaging-purpose video signal using only the signals from the imaging-purpose imaging unit 3 and without using the G2 signal from the AF-purpose imaging unit 7 in the same manner as the conventional imaging apparatus with the AF function. In an out-of-focus state, the imaging apparatus 100 therefore generates an imaging-purpose video signal without being affected by the signal used for AF detection.

The out-of-focus state may not necessarily be detected based on the degree by which the contrast evaluation amount changes. Alternatively, for example, the out-of-focus state may be detected based on the lens operation of a focus ring, the movement of the imaging apparatus observed using a gyroscope or the like, or the state of an external switch that is operated by the user, or by using some of these methods in combination.

The states that can be indicated by the focus-state information should not be limited to an in-focus state and an out-of-focus state, but may for example be three states, that is, an in-focus state, a semi-in-focus state in which the imaging apparatus 100 might be slightly out of focus, and an out-of-focus state.

When the focus-state information can indicate the three states, the signal processing unit 6 may generate an imaging-purpose video signal using a weighted signal obtained by weighting the G2 signal for AF detection with respected to the R, G1, and B signals is in an semi-in-focus state. In other words, the signal processing unit 6 may use a portion of the AF signal to generate an imaging-purpose video signal.

The signal processing performed by the imaging-purpose signal generation unit 15 may not necessarily be switched (between the signal processing according to a dual-green technique and the signal processing according to a triple-sensor technique) immediately when the focus-state information changes. Alternatively, the signal processing performed by the imaging-purpose signal generation unit 15 may be switched gradually after the focus-state information changes. In this case, the imaging apparatus 100 can obtain an image in which the resolution and the S/N ratio do not change rapidly. As a result, the imaging apparatus 100 obtains an image that is seen natural.

1.2 Method for Calculating the Contrast Evaluation Value

A method used by the AF evaluation value generation unit 9 to calculate a contrast evaluation value using an AF-purpose video signal will now be described with reference to FIG. 3.

Figure 3:
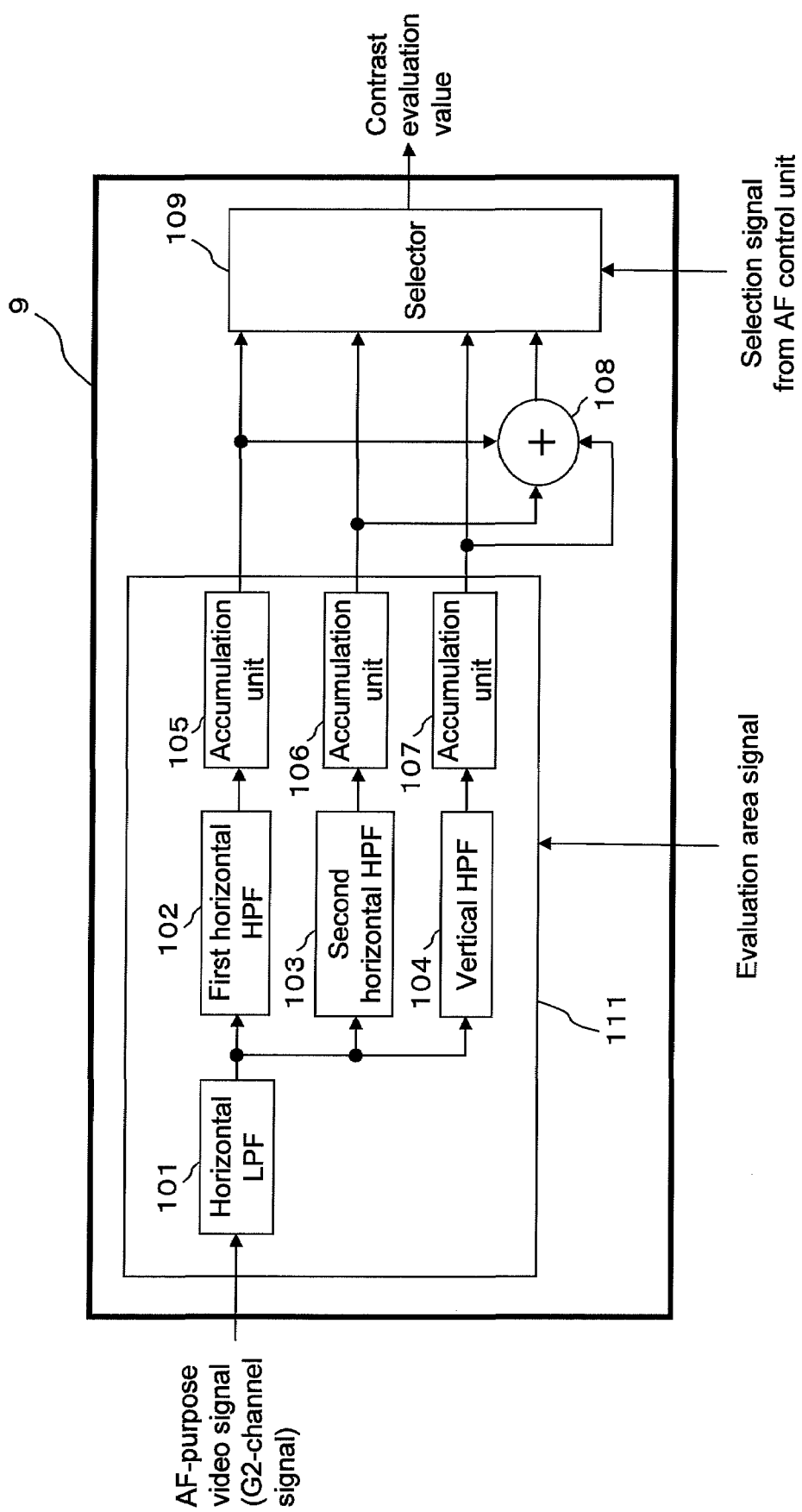
FIG. 3 is a block diagram showing the structure of an AF evaluation value generation unit in the first embodiment.

FIG. 3 is a block diagram showing one example of the structure of the AF evaluation value generation unit 9.

A horizontal low-pass filter 101 (hereafter referred to as a "horizontal LPF") (a low-pass filter for filtering horizontal elements of a video signal) extracts frequency elements necessary to generate a contrast evaluation value from an AF-purpose video signal that is input from the AD conversion unit 5. The horizontal LPF 101 outputs the filtered signal to a first horizontal HPF 102, a second horizontal HPF 103, and a vertical HPF 104.

The two horizontal high-pass filters 102 and 103 (hereafter referred to as the "first horizontal HPF" and the second horizontal HPF") are high-pass filters for filtering horizontal elements of an AF-purpose video signal. The first horizontal HPF 102 and the second horizontal HPF 103 differ from each other in their passage frequencies. The first horizontal HPF 102 is a high-pass filter (for low frequencies) that allows lower frequencies than the second horizontal HPF 103 to pass through. The second horizontal HPF 103 is a high-pass filter (for high frequencies) that allows higher frequencies than the first horizontal HPF 102 to pass through. More specifically, the cutoff frequency of the first horizontal HPF 102 is set lower than the cutoff frequency of the second horizontal HPF 103. The vertical high-pass filter 104 (hereafter referred to as the "vertical HPF") is a high-pass filter for filtering vertical elements of an AF-purpose video signal.

Accumulation units 105 to 107 accumulate video signals corresponding to pixels included in an AF evaluation area (described later) processed through the high-pass filters 102 to 104, and output the accumulated signals to an adder 108 and a selector 109. The horizontal LPF 101, the first horizontal HPF 102, the second horizontal HPF 103, the vertical HPF 104, and the accumulation units 105 to 107 form an arithmetic unit 111. The arithmetic unit 111 receives an evaluation area signal from a drive unit (not shown). The evaluation area signal is used to select the AF evaluation area, which is an area for which the AF evaluation value generation unit 9 generates a contrast evaluation value (area included in a two-dimensional image that is formed using an AF-purpose video signal). When, for example, the AF-purpose video signal is assumed to correspond to a central portion of a screen (two-dimensional image that is formed using an AF-purpose video signal), the evaluation area signal may for example be a pulsed signal indicating the timing corresponding to the central portion of the screen. The evaluation area signal may be input only into the accumulation units 105 to 107. In this case, the accumulation units 105 to 107 may accumulate only values included the AF evaluation area among the signals output from the high-pass filters 102 to 104 and may output the accumulated values to the adder 108 and the selector 109.

The adder 108 adds together the outputs from the accumulation units 105 to 107, and outputs the addition result to the selector 109. The selector 109 selects the output from one of the accumulation units 105 to 107 and the adder 108 based on a selection signal, and outputs the selected value to the AF control unit 10 as an evaluation value (contrast evaluation value).

When, for example, the imaging apparatus 100 handles an SDTV (standard definition television) video signal, the passage frequencies of the horizontal LPF 101, the first horizontal HPF 102, the second horizontal HPF 103, and the vertical HPF 104 are preferably 0 to 2.0 MHz for the horizontal LPF 101, 300 kHz or more for the first horizontal HPF 102, 1.2 MHz or more for the second horizontal HPF 103, and 20 lines of resolution or more for the vertical HPF 104. When the imaging apparatus 100 handles an HDTV (high definition television) video signal, the passage frequencies are preferably 0 to 13.2 MHz for the horizontal LPF 101, 2.0 MHz or more for the first horizontal HPF 102, 6.6 MHz or more for the second horizontal HPF 103, and 45 lines of resolution or more for the vertical HPF 104.

The operation of the AF evaluation value generation unit 9 will now be described in detail.

First, an AF-purpose video signal input into the AF evaluation value generation unit 9 is processed using the horizontal LPF to reduce noise elements of the AF-purpose video signal. The AF-purpose signal processed through the horizontal LPF is then processed using the plurality of high-pass filters. As shown in FIG. 3, the AF-purpose video signal is input into the arithmetic unit 111. As described above, the evaluation area signal is input into the arithmetic unit 111. The arithmetic unit 111 uses only signal elements of the input AF-purpose video signal included in the AF evaluation area indicated by the evaluation area signal. In the arithmetic unit 111, the AF-purpose video signal processed using the horizontal LPF 101 is then input into the first horizontal HPF 102, the second horizontal HPF 103, and the vertical HPF 104. The signal resulting from the processing performed using each HPF is accumulated by the corresponding accumulation units 105, 106, and 107, and is then output to the selector 109 and the adder 108. The outputs from the accumulation units 105, 106, and 107 are then added together by the adder 108, and the signal resulting from the addition is input into the selector 109. More specifically, the four values in total, namely, the three outputs of the three accumulation units 105 to 107 and the output of the adder 108 obtained by adding the three outputs of the accumulation units are input into the selector 109. One of the four values input into the selector 109 is selected based on a selection signal provided from the AF control unit 10. The selected value is then output to the AF control unit 10 as the contrast evaluation value. In the present embodiment, for example, when the selection signal is a signal H1, the selector 109 selects the signal obtained by accumulating the output from the first horizontal HPF 102. When the selection signal is a signal H2, the selector 109 selects the signal obtained by accumulating the output from the second horizontal HPF 103. When the selection signal is a signal V1, the selector 109 selects the signal obtained by accumulating the output from the vertical HPF 104. When the selection signal is a signal S1, the selector 109 selects the signal obtained by adding together the three signals using the adder 108.

The selection signal is used to select an optimum signal according to an image to be formed or the current focus position.

Figure 4:
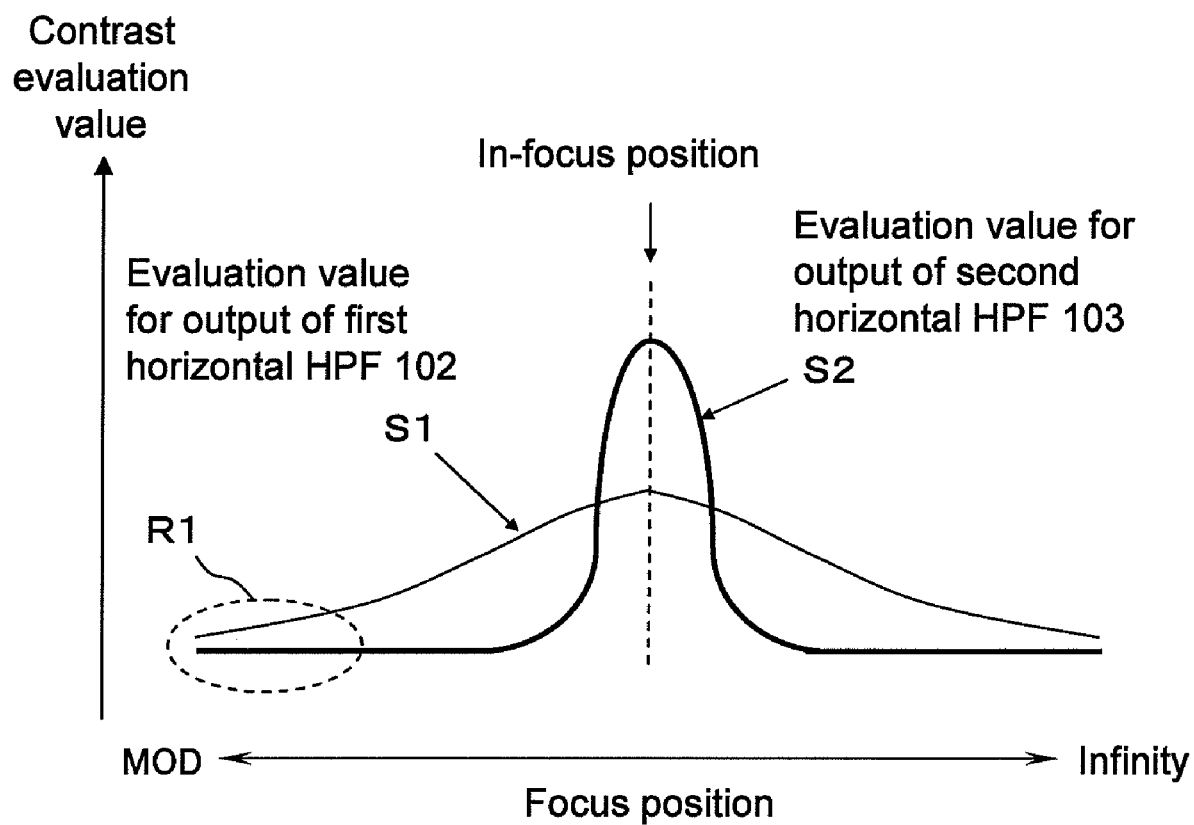
FIG. 4 is a schematic diagram describing an effect of the AF evaluation value generation unit in the first embodiment.

For example, the curves showing the evaluation values of the first horizontal HPF 102 (for low frequencies) and the second horizontal HPF 103 (for high frequencies) may have the characteristics shown in FIG. 4. In FIG. 4, the horizontal axis indicates the focus position, and the vertical axis indicates the contrast evaluation value.

As shown in FIG. 4, the curve (curve S1) showing the contrast evaluation values obtained by accumulating the output of the first horizontal HPF 102 (for low frequencies) has a broad peak. The curve (curve S2) showing the contrast evaluation values obtained by accumulating the output of the second horizontal HPF 103 (for high frequencies) is first flat and then has a sharp peak around the in-focus position. When, for example, the imaging apparatus 100 is used to form an image of a horizontal stripe pattern, the curve showing the contrast evaluation values obtained by accumulating the output of the first horizontal HPF 102 as well as the curve showing the contrast evaluation values obtained by accumulating the output of the second horizontal HPF 103 would have almost no peak, whereas the curve showing the contrast evaluation values obtained by accumulating the output of the vertical HPF 104 would have a peak value at the in-focus position. Thus, the curve showing the contrast evaluation values obtained by accumulating the output of the vertical HPF 104 has a peak around the in-focus position.

A selection signal output from the AF control unit 10 and a contrast evaluation value generated by the AF evaluation value generation unit 9 based on the selection signal will be described.

The algorithm called hill climbing, with which the contrast-evaluation-value maximizing optical-path length is detected by repeatedly moving the AF-purpose imaging unit 7 back and fourth along the optical axis in a direction in which the contrast evaluation value increases, will now be described.

The AF control unit 10 first outputs a selection signal H2 to the selector 109 of the AF evaluation value generation unit 9. Based on the selection signal, the selector 19 selects a value obtained by accumulating the output from the second horizontal HPF 103 (for high frequencies). The value selected by the selector 109 is output from the AF evaluation value generation unit 9 to the AF control unit 10 as a contrast evaluation value. When the focus position is distant from the in-focus position, the AF control unit 10 compares the contrast evaluation values while moving the focus position by every predetermined amount but may only determine that the contrast evaluation value obtained by accumulating the output of the second horizontal HPF 103 (for high frequencies) does not change (for example, the contrast evaluation value indicated by the curve S2 does not change much in a portion R1 in FIG. 4). In such a case, the AF control unit 10 next outputs a selection signal H1 to the selector 109 of the AF evaluation value generation unit 9. Based on the selection signal, the selector 109 selects the value obtained by accumulating the output from the first horizontal HPF 102 (for low frequencies). The value selected by the selector 109 is output from the AF evaluation value generation unit 9 to the AF control unit 10 as the contrast evaluation value. In this case, the AF control unit 10 determines that the contrast evaluation value changes. Thus, the imaging apparatus 100 can determine the direction in which the focus position is to be adjusted (for example, the contrast evaluation value indicated by the curve S1 changes in the portion R1 in FIG. 4, and therefore the apparatus can determine the direction in which the in-focus position is). Through such control, the imaging apparatus 100 can adjust the focus position to the in-focus position even when the current focus position is distant from the in-focus position. In the same manner, the AF control unit 10 moves the AF-purpose imaging unit 7 to a position near the in-focus position based on the accumulated value of the output from the first horizontal HPF 102 (for low frequencies). Finally, the AF control unit 10 again outputs a selection signal H2. Based on the selection signal, the AF evaluation value generation unit 9 selects the accumulated value of the output from the second horizontal HPF 103 (for high frequencies). Through such control, the imaging apparatus 100 detects the in-focus position with a higher precision based on the accumulated value of the output from the second horizontal HPF 103, and determines the contrast-evaluation-value maximizing optical-path length. Further, when the AF control unit 10 determines that the contrast evaluation value calculated based on the accumulated value of the first horizontal HPF 102 and the contrast evaluation value calculated based on the accumulated value of the second horizontal HPF 103 both do not change, the AF control unit 10 may output a selection signal V1, and the AF evaluation value generation unit 9 may select the accumulated value of the output from the vertical HPF 104 based on the selection signal.

In the imaging apparatus 100, the AF control unit 10 may first output a selection signal S1 to the AF evaluation value generation unit 9, and may execute rough control using a value obtained by adding the accumulated values of the outputs of the first horizontal HPF 102, the second horizontal HPF 103, and the vertical HPF 104 (that is, the output from the adder 108) as the contrast evaluation value, and may then later finally determine the in-focus position using the contrast evaluation value calculated based on the accumulated value of the output from the second horizontal HPF 103 or from the vertical HPF 104. The imaging apparatus 100 may execute focus control in this manner. The HPFs should not be limited to the HPFs with the frequency range, type, and selection method described above.

1.3 Search Method for the Contrast-Evaluation-Value Maximizing Optical-Path Length A method used by the AF control unit 10 to obtain a contrast evaluation value while sequentially changing the optical-path length of the AF-purpose imaging unit 7 and detect the optical-path length corresponding to a maximum contrast evaluation value (contrast-evaluation-value maximizing optical-path length) will now be described with reference to FIG. 5.

Figure 5:
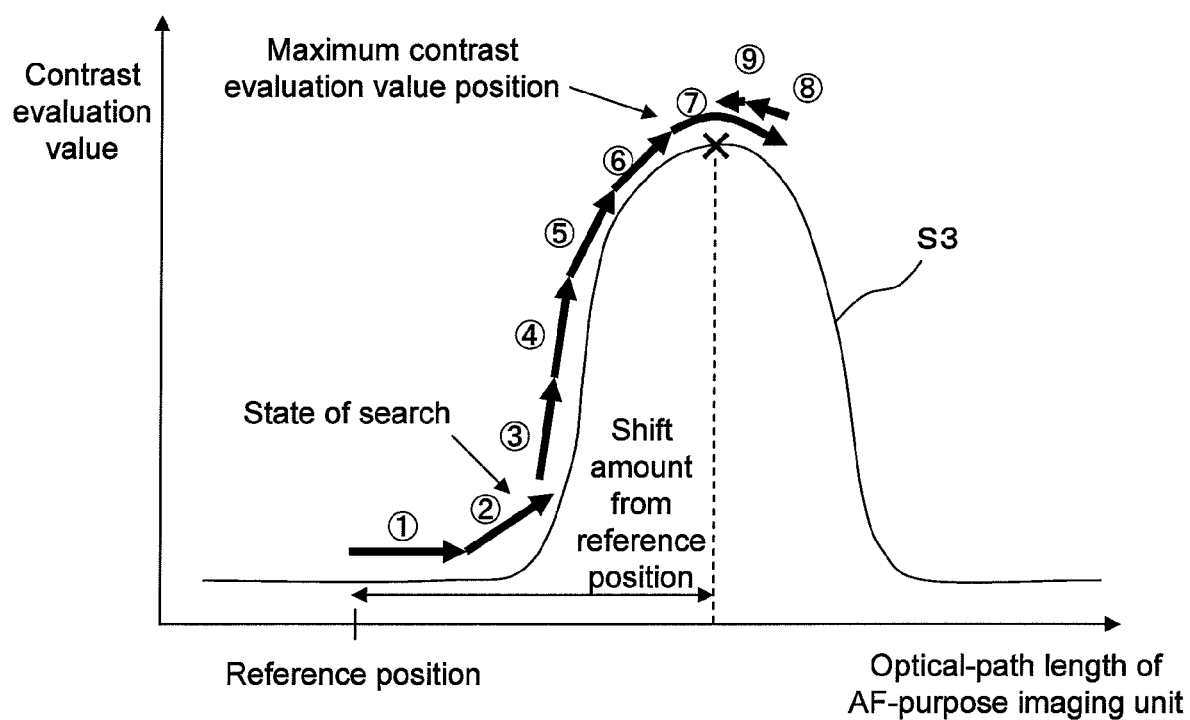
FIG. 5 is a schematic diagram describing searching for an optical-path length corresponding to a maximum contrast evaluation value in the first embodiment.

FIG. 5 is a schematic diagram describing one example of searching for the contrast-evaluation-value maximizing optical-path length.

In FIG. 5, the horizontal axis indicates the optical-path length of the AF-purpose imaging unit 7, and the vertical axis indicates the contrast evaluation value calculated by the AF evaluation value generation unit 9. In FIG. 5, an arrow drawn with a thick line indicates each search operation, and a curve S3 shows the contrast evaluation values. The search started at the search start position to determine the position corresponding to the maximum contrast evaluation value will now be described with reference to FIG. 5.

The AF optical-path length changing unit 11 first changes the optical-path length in one of the forward and backward directions on the optical axis, and outputs the contrast evaluation value corresponding to the optical-path length obtained by the AF evaluation value generation unit 9 to the AF control unit 10. The AF control unit 10 compares the contrast evaluation value corresponding to the current position with the contrast evaluation value corresponding to the previous position. When determining that the contrast evaluation value decreases, the AF control unit 10 inverts the direction in which the AF optical-path length changing unit 11 moves the AF-purpose imaging unit 7. In the example shown in FIG. 5, the AF control unit 10 changes the optical-path length to the right (the direction in which the optical-path length of the AF-purpose imaging unit would increase) in the first search operation. The AF control unit 10 determines that the contrast evaluation value does not change much. In the second search operation, the AF control unit 10 changes the optical-path length in the same direction as in the first search operation. The AF control unit 10 then determines that the contrast evaluation value increases after the second change of the optical-path length, and therefore continues the search in the same direction. In this example, the contrast evaluation value increases every after the second to sixth change of the optical-path length. Thus, the AF control unit 10 determines that the position corresponding to the maximum contrast value would be to the right. The AF control unit 10 then determines that the contrast evaluation value decreases after the seventh change of the optical-path length. In other words, the AF control unit 10 determines that the contrast evaluation value passes its maximum after the seventh change, and therefore inverts the direction in which the optical-path length of the AF-purpose imaging unit is changed with respect to the direction used in the seventh search operation. The position corresponding to the optical-path length can be predicted to be near the maximum position (position corresponding to the contrast-evaluation-value maximizing optical-path length). In the ninth search operation, the AF control unit 10 continues the same search as before but by changing the optical-path length by a degree smaller than in the preceding search operations. The AF control unit 10 then detects, as the maximum position (position corresponding to the contrast-evaluation-value maximizing optical-path length), the position at which the contrast evaluation value decreases after changing the optical-path length in either of the two directions. When the AF control unit 10 changes the optical-path length of the AF-purpose imaging unit to the left in FIG. 5 in the first search operation, the AF control unit 10 inverts the search direction to the right in FIG. 5 after determining that the search position reaches the end (to which the AF-purpose imaging unit 7 is movable by the AF optical-path length changing unit 11). In this manner, the AF control unit 10 can detect the position corresponding to the maximum contrast evaluation value in a reliable manner.

As described above, the imaging apparatus 100 detects the optical-path length corresponding to the maximum contrast evaluation value using an AF-purpose video signal independent of an imaging-purpose video signal. In other words, the imaging apparatus 100 does not control (change) the focus position of the optical system 1 and does not use an imaging-purpose auxiliary signal in the signal processing unit 6 while searching for the position corresponding to the maximum contrast evaluation value using the AF optical-path length changing unit 11. Thus, the imaging-purpose video signal in the imaging apparatus 100 is not affected by the AF-purpose signal. In an in-focus state, the imaging apparatus 100 generates an imaging-purpose video signal using also a light beam separated for use in the AF-purpose imaging unit, and therefore prevents the S/N ratio and the resolution from decreasing.

Further, the imaging apparatus 100 executes focus control over the optical system after detecting the contrast-evaluation-value maximizing optical-path length using the AF-purpose video signal. Thus, even with the structure in which a high-speed lens operation such as a wobbling operation cannot be performed as the AF operation, or more specifically with the structure using for example an exchangeable lens, the imaging apparatus 100 enables the AF function in a reliable manner. Also, the search for the contrast-evaluation-value maximizing optical-path length does not affect an imaging-purpose video signal. This widens the range in which the search for the contrast-evaluation-value maximizing optical-path length can be performed. As a result, the imaging apparatus 100 can detect the position corresponding the maximum contrast evaluation value in a reliable manner even in a greatly out-of-focus state. Also, even when the search for the in-focus position is performed again due to, for example, erroneous activation of the AF operation in an in-focus state of the optical system, the imaging apparatus 100 performs the search operation again after the focus-state information is set to an out-of-focus signal. Thus, the imaging apparatus 100 can search for the in-focus point position without causing an imaging-purpose video signal to be affected by an AF-purpose signal.

In the present embodiment, the AF evaluation value generation unit 9 includes the arithmetic unit 111 including the horizontal LPF 101, the first horizontal HPF 102, the second horizontal HPF 103, the vertical HPF 104, and the accumulation units 105, 106, and 107, the adder 108, and the selector 109. However, the AF evaluation value generation unit 9 should not be limited to this structure. The AF evaluation value generation unit 9 may have any other structure (circuit) as long as the AF evaluation value generation unit 9 can detect a value evaluating the contrast of an image. For example, the AF evaluation value generation unit 9 be formed by a single horizontal HPF that can vary its passage frequency characteristics.

Although the optical-path length is changed greatly from the beginning in the search for the position corresponding to the maximum contrast evaluation value in the present embodiment, the contrast-evaluation-value maximizing optical-path length detection should not be limited to this method. For example, the AF control unit 10 may detect the optical-path length corresponding to the maximum contrast evaluation value by gradually moving the AF-purpose imaging unit 7 in the optical axis direction using the AF optical-path length changing unit 11 and evaluating the contrast evaluation value obtained when the optical-path length of the second light beam (light beam for AF detection) is changed gradually. In this case, the AF-purpose imaging unit 7 starts moving from the reference position and first moves, for example, to a position corresponding to a minimum optical-path length within its movable range. The AF-purpose imaging unit 7 may then sequentially detect the contrast evaluation value while moving the AF-purpose imaging unit 7 from the position corresponding to the minimum optical-path length to the position corresponding to the maximum optical-path length. The AF-purpose imaging unit 7 may then determine the maximum evaluation value among the evaluation values detected in a predetermined range as the maximum contrast evaluation value, and may use the optical-path length corresponding to the maximum contrast evaluation value as the contrast-evaluation-value maximizing optical-path length. Although this detection method requires a long time, this method enables the maximum contrast evaluation value to be obtained in a more reliable manner. The above method may also be combined with the conventional wobbling operation to search for the optical-path length corresponding to the maximum contrast evaluation value. More specifically, any method with which the optical-path length corresponding to the maximum contrast evaluation value can be detected may be used. For example, the position corresponding to the maximum contrast evaluation value may be detected by repeating the wobbling operation using the algorithm called hill climbing, or by changing the optical-path length using a golden section method or the like.

SECOND EMBODIMENT

2.1 Structure of the Imaging Apparatus

Figure 6:
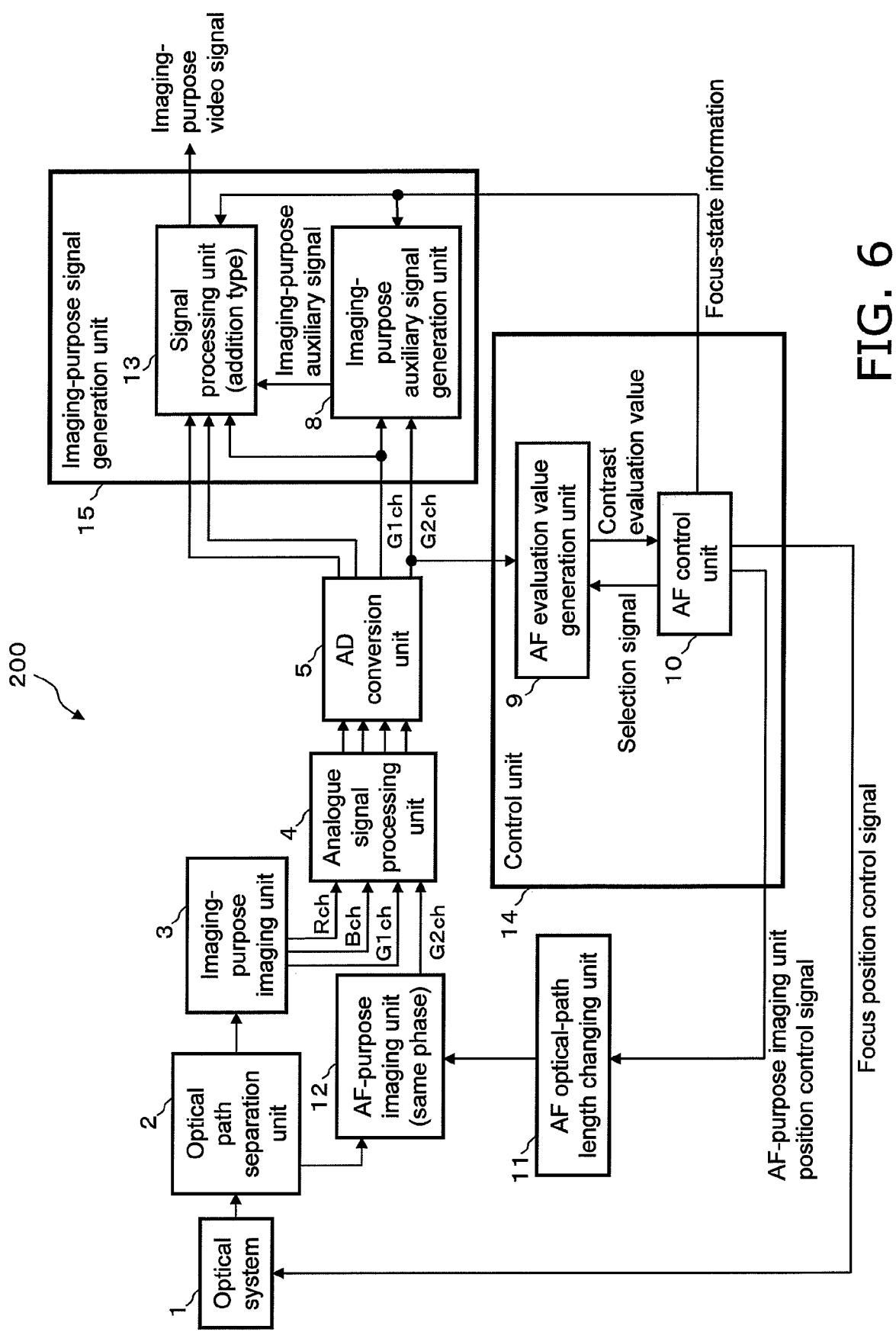
FIG. 6 is a block diagram showing the structure of an imaging apparatus with an autofocus function according to a second embodiment of the present invention.

FIG. 6 is a block diagram showing the structure of an imaging apparatus 200 with an AF function according to a second embodiment of the present invention. The imaging apparatus 200 of the present embodiment differs from the imaging apparatus 100 of the first embodiment only in the position at which an image sensor of its AF-purpose imaging unit 12 is arranged and a signal processing method used by its signal processing unit 13. More specifically, the imaging apparatus 200 differs from the imaging apparatus 100 only in that an image sensor for G2 included in the AF-purpose imaging unit 12 is fixed at a position optically completely equivalent to the position at which an image sensor for G1 included in an imaging-purpose imaging unit 3 is arranged, and in that the signal processing unit 13 uses, in an in-focus state, a signal processing method of generating an imaging-purpose video signal after adding together an imaging-purpose auxiliary signal (G2) and an imaging-purpose signal (G1).

The components of the imaging apparatus 200 that are the same as the components of the imaging apparatus 100 of the first embodiment are given the same reference numerals as those components. For ease of explanation, the operation of the signal processing unit 13 in an in-focus state will be described in detail. The other components are the same as described in the first embodiment. The components that are the same as in the first embodiment will not be described in detail.

Unlike in the first embodiment, the AF-purpose imaging unit 12 includes an image sensor fixed at a position optically equivalent to the position at which an image sensor for G1 included in the imaging-purpose imaging unit 3 is arranged. The operation of the AF-purpose imaging unit 12 is the same as the operation of the AF-purpose imaging unit 7 of the first embodiment. With the image sensor of the AF-purpose imaging unit 12 arranged at the position different from the arrangement position of the image sensor of the AF-purpose imaging unit 7 of the first embodiment, the AF-purpose imaging unit 12 outputs an AF-purpose signal (G2 signal) different from the signal output in the first embodiment. More specifically, a G2 signal output from the AF-purpose imaging unit 7 in the first embodiment has a phase that is 180 degrees different from the phase of a G1 signal, whereas a G2 signal output from the AF-purpose imaging unit 12 of the second embodiment has the same phase as a G1 signal. The imaging apparatus 200 (and the imaging apparatus 100 as well) generates an AF-purpose contrast evaluation value by calculating a value evaluating high-frequency elements. Thus, the phase difference of the AF signal (G2 signal) does not affect the AF function of the imaging apparatus.

2.2 Operation of the Imaging Apparatus

The operation of the imaging apparatus 200 will now be described.

In the same manner as in the first embodiment, an AF signal (G2 signal) is input into the imaging-purpose auxiliary signal generation unit 8 in the imaging-purpose signal generation unit 15 after processed by the analogue signal processing unit 4 and the AD conversion unit 5 in the second embodiment.

The imaging-purpose auxiliary signal generation unit 8 receives a G1 signal and a G2 signal output from the AD conversion unit 5 and focus-state information output from the AF control unit 10. When the focus-state information is an in-focus signal, the imaging-purpose auxiliary signal generation unit 8 outputs the G2 signal from the AF-purpose imaging unit 12 to the signal processing unit 13 as an imaging-purpose auxiliary signal. When the focus-state information is an out-of-focus signal, the imaging-purpose auxiliary signal generation unit 8 outputs a zero signal (including no signal) or the G1 signal to the signal processing unit 13 as an imaging-purpose auxiliary signal.

When the focus-state information is an in-focus signal, the signal processing unit 13 adds an AF-purpose signal (G2 signal) from the AF-purpose imaging unit 12, which is output from the imaging-purpose auxiliary signal generation unit 8, and a G1 signal from the imaging-purpose imaging unit 3 to generate a G signal, and performs signal processing according to an ordinary triple-sensor imaging technique, which is the signal processing to be performed subsequently, to generate an imaging-purpose video signal. When the focus-state information is an out-of-focus signal, the signal processing unit 13 multiplies the G1 signal output from the AD conversion unit 5 by a gain without using the imaging-purpose auxiliary signal, and performs signal processing. More specifically, in this case, the signal processing unit 13 performs signal processing according to an ordinary triple-sensor imaging technique using only the signals from the imaging-purpose imaging unit 3 to generate an imaging-purpose video signal. In this case, the gain by which the G1 signal is multiplied is determined according to the percentage of the G2 beam in the G beam separated by the optical path separation unit 2. When, for example, the percentage is 25%, the gain by which the G1 signal is multiplied is determined to be 100/(100−25) (%). The signal processing unit 13 multiplies the G1 signal by the gain in this manner to correct the signal level of the G-channel signal. More specifically, the signal level of the G-channel signal, which is lower than other-channel signals, or more specifically the signal level of the G-channel signal lowered by separating the G2 signal for AF, is corrected through the above gain multiplication performed by the signal processing unit 13.

The conventional imaging apparatus with the AF function uses only the G1 signal to generate an imaging-purpose video signal, and uses the G2 signal separated for AF only to enable the AF function. Thus, the conventional imaging apparatus has a lower resolution and a lower S/N ratio in the G-channel as compared with an ordinary triple-sensor structure imaging apparatus. In contrast, the imaging apparatus 200 with the AF function according to the present embodiment generates an imaging-purpose video signal using both the optically separated G1-channel signal and G2-channel signal in an in-focus state. This structure prevents the resolution and the S/N ratio in an in-focus state from decreasing.

Further, when the focus-state information indicates an out-of-focus state, the imaging apparatus 200 generates an imaging-purpose video signal using only the signals from the imaging-purpose imaging unit 3 (signals output from the AD conversion unit 5) and without using the G2 signal from the AF-purpose imaging unit 12 in the same manner as the conventional imaging apparatus with the AF function. Thus, the imaging apparatus 200 generates an imaging-purpose video signal without being affected by an AF-purpose signal in an out-of-focus state.

The imaging apparatuses of the first and second embodiments will now be described briefly by comparing the structures of the first and second embodiments. In the imaging apparatus 100 of the first embodiment, the image sensor for the G1-channel included in the imaging-purpose imaging unit 3 and the image sensor for the G2-channel included in the AF-purpose imaging unit 7 are fixed at positions optically different from each other by the distance corresponding to half a pixel in the horizontal direction. The imaging apparatus 100 with this structure alternately outputs a G1 signal and a G2 signal with a doubled clock rate when the signal processing unit 6 uses the G2-channel in an in-focus state, and thereby forms an image with a higher resolution as compared with an ordinary triple-sensor structure imaging apparatus. More specifically, the AF-purpose imaging unit 7 that is movable along the optical axis in the imaging apparatus 100 obtains a G-channel video signal with a four-sensor imaging technique according to a dual-green technique. The imaging apparatus 100 with this structure enables the AF function, and also improves the resolution in an in-focus state in the same manner as the four-sensor structure imaging apparatus.

In the imaging apparatus 200 of the second embodiment, the image sensor for the G2-channel included in the AF-purpose imaging unit 12 is fixed at the optically completely same position as the image sensor for the G1-channel included in the imaging-purpose imaging unit 3. The imaging apparatus 200 with this structure adds the G1-channel video signal and the G2-channel video signal together and uses the addition result as the G-channel signal to generate a video signal used subsequently when the signal processing unit 13 uses the G2-channel. More specifically, the imaging apparatus 200 enables the AF function by using a video signal obtained through photoelectric conversion of the G2-channel light beam, which is separated from the green light beam used with an ordinary triple-sensor technique using the AF-purpose imaging unit 12, which is movable along the optical axis.

Further, the signal processing unit 13 of the imaging apparatus 200 again adds the video signal obtained for AF detection using the optically separated G2 beam to generate an imaging-purpose video signal in an in-focus state. Also, in an out-of-focus state, the imaging apparatus 200 multiplies the G1-channel video signal by the gain and uses the resulting signal as the G-channel signal to generate a video signal used subsequently.

As described above, the imaging apparatus 200 enables the AF control to be executed without affecting a video signal, and also prevents the image qualities, such as the resolution and the S/N ratio, in an in-focus state from decreasing.

OTHER EMBODIMENTS

In the above embodiments, the area used for AF evaluation can be set freely, or more specifically the position, the size etc. of the AF evaluation area can be set freely.

The AF evaluation area may be determined by adding a plurality of areas (image areas) in an image formed using a video signal or may be an area (image area) selected from a plurality of areas. For example, the imaging apparatus may detect a left area, a central area, and a right area in the screen separately, and may determine an area containing a subject as the AF evaluation area. An area containing a subject may be selected, for example, by detecting an area with a maximum AF evaluation value, or based on a switch operation performed by the user, or by detecting an area containing a face.

Some or all of the blocks of the imaging apparatus described in each of the above embodiments may be formed using a single chip using a semiconductor device, such as a system LSI (large scale integration).

Although the semiconductor device technology is referred to as LSI, the technology may be instead referred to as IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks of the imaging apparatus. Biotechnology is potentially applicable.

The processes described in the above embodiments may be realized using either hardware or software, or may be realized using both software and hardware. When the imaging apparatus of each of the above embodiments is implemented by hardware, the imaging apparatus requires timing adjustment for each of its processes. For ease of explanation, timing adjustment associated with various signals required in an actual hardware design is not described in detail in the above embodiments.

The structures described in detail in the above embodiments are mere examples of the present invention, and may be changed and modified variously without departing from the scope and spirit of the invention.

INDUSTRIAL APPLICABILITY

The imaging apparatus, the imaging method, the program, and the integrated circuit of the present invention enable the AF function through AF control executed by detecting the optical-path length corresponding to the maximum contrast using an AF-purpose video signal, and generating and using an imaging-purpose auxiliary signal using the focus-state information, and do not affect an imaging-purpose video signal when detecting the optical-path length. The present invention is therefore applicable to an imaging apparatus, such as a video camera.

The imaging apparatus, the imaging method, the program, and the integrated circuit of the present invention enable the AF function through focus control executed over the optical system after detecting the optical-path length corresponding to the maximum contrast using an AF-purpose video signal, and therefore enable the AF function of an imaging apparatus that cannot perform a high-speed lens operation, such as a wobbling operation. The present invention is therefore applicable to an imaging apparatus, such as a video camera.

The imaging apparatus, the imaging method, the program, and the integrated circuit of the present invention enable the AF function without affecting an imaging-purpose video signal during a focus search operation, and thus enable the search to be performed in a wider range, and enable reliable control to be executed even in a greatly out-of-focus state. The present invention is therefore applicable to an imaging apparatus, such as a video camera.

The imaging apparatus, the imaging method, the program, and the integrated circuit of the present invention enable an imaging-purpose video signal to be generated using also an AF signal in an in-focus state, and thus prevent the image qualities, such as the resolution and the S/N ratio, from decreasing. The present invention is therefore applicable to an imaging apparatus, such as a video camera.

What is claimed is:

1. An imaging apparatus, comprising:
an optical system that focuses light from a subject and over which focus control is executed;
an optical path separation unit that separates the light from the subject focused by the optical system into at least a first light beam and a second light beam;
a first imaging unit that includes an image sensor, and converts the first light beam to an electric signal and outputs the electric signal as a first signal;
a second imaging unit that includes an image sensor, and converts the second light beam to an electric signal and outputs the electric signal as a second signal;
an optical-path length changing unit that changes an optical-path length of the second light beam by moving the second imaging unit along an optical axis of the second light beam;
a control unit that generates a contrast evaluation value of the second signal output from the second imaging unit while controlling the optical-path length changing unit to change the optical-path length of the second light beam, and detects, as a contrast-evaluation-value maximizing optical-path length, an optical-path length of the second light beam corresponding to a maximum contrast evaluation value, and executes focus control over the optical system based on the contrast-evaluation-value maximizing optical-path length and outputs focus-state information indicating an in-focus state; and
an imaging-purpose signal generation unit that generates a video signal for imaging-purpose using the first signal and the second signal when the focus-state information indicates an in-focus state, and generates a video signal for imaging-purpose using the first signal and without using the second signal when the focus-state information indicates an out-of-focus state.

2. The imaging apparatus according to claim 1,
wherein the image sensor of the second imaging unit is arranged at a position shifting in a horizontal direction on a surface of the image sensor by a distance corresponding to half a pixel from a position optically equivalent to a position of the image sensor of the first imaging unit, and
when the focus-state information indicates an in-focus state, the imaging-purpose signal generation unit generates the imaging-purpose video signal using the first signal and the second signal with a clock having a frequency twice a frequency of a clock used when processing only the first signal.

3. The imaging apparatus according to claim 1,
wherein the image sensor of the second imaging unit is arranged at a position optically equivalent to a position of the image sensor of the first imaging unit, and
when the focus-state information indicates an in-focus state, the imaging-purpose signal generation unit generates the imaging-purpose video signal by adding the first signal and the second signal.

4. An imaging method used in an imaging apparatus including an optical system that focuses light from a subject and over which focus control is executed, an optical path separation unit that separates the light from the subject focused by the optical system into at least a first light beam and a second light beam, a first imaging unit that includes an image sensor, and converts the first light beam to an electric signal and outputs the electric signal as a first signal, a second imaging unit that includes an image sensor, and converts the second light beam to an electric signal and outputs the electric signal as a second signal, and an optical-path length changing unit that changes an optical-path length of the second light beam by moving the second imaging unit along an optical axis of the second light beam,
the imaging method comprising:
generating a contrast evaluation value of the second signal output from the second imaging unit while changing the optical-path length of the second light beam by moving the second imaging unit along the optical axis of the second light beam, and detecting, as a contrast-evaluation-value maximizing optical-path length, an optical-path length of the second light beam corresponding to a maximum contrast evaluation value, and executing focus control over the optical system based on the contrast-evaluation-value maximizing optical-path length and outputting focus-state information indicating an in-focus state; and
generating a video signal for imaging-purpose using the first signal and the second signal when the focus-state information indicates an in-focus state, and generating a video signal for imaging-purpose using the first signal and without using the second signal when the focus-state information indicates an out-of-focus state.

5. A computer-readable storage medium storing a program that enables a computer to implement an imaging method used in an imaging apparatus including an optical system that focuses light from a subject and over which focus control is executed, an optical path separation unit that separates the light from the subject focused by the optical system into at least a first light beam and a second light beam, a first imaging unit that includes an image sensor, and converts the first light beam to an electric signal and outputs the electric signal as a first signal, a second imaging unit that includes an image sensor, and converts the second light beam to an electric signal and outputs the electric signal as a second signal, and an optical-path length changing unit that changes an optical-path length of the second light beam by moving the second imaging unit along an optical axis of the second light beam,
the imaging method comprising:
generating a contrast evaluation value of the second signal output from the second imaging unit while changing the optical-path length of the second light beam by moving the second imaging unit along the optical axis of the second light beam, and detecting, as a contrast-evaluation-value maximizing optical-path length, an optical-path length of the second light beam corresponding to a maximum contrast evaluation value, and executing focus control over the optical system based on the contrast-evaluation-value maximizing optical-path length and outputting focus-state information indicating an in-focus state; and
generating a video signal for imaging-purpose using the first signal and the second signal when the focus-state information indicates an in-focus state, and generating a video signal for imaging-purpose using the first signal and without using the second signal when the focus-state information indicates an out-of-focus state.

6. An integrated circuit used in an imaging apparatus including an optical system that focuses light from a subject and over which focus control is executed, an optical path separation unit that separates the light from the subject focused by the optical system into at least a first light beam and a second light beam, a first imaging unit that includes an image sensor, and converts the first light beam to an electric signal and outputs the electric signal as a first signal, a second imaging unit that includes an image sensor, and converts the second light beam to an electric signal and outputs the electric signal as a second signal, and an optical-path length changing unit that changes an optical-path length of the second light beam by moving the second imaging unit along an optical axis of the second light beam,
the integrated circuit comprising:
a control unit that generates a contrast evaluation value of the second signal output from the second imaging unit while changing the optical-path length of the second light beam by moving the second imaging unit along the optical axis of the second light beam, and detects, as a contrast-evaluation-value maximizing optical-path length, an optical-path length of the second light beam corresponding to a maximum contrast evaluation value, and executes focus control over the optical system based on the contrast-evaluation-value maximizing optical-path length and outputs focus-state information indicating an in-focus state; and
an imaging-purpose signal generation unit that generates a video signal for imaging-purpose using the first signal and the second signal when the focus-state information indicates an in-focus state, and generates a video signal for imaging-purpose using the first signal and without using the second signal when the focus-state information indicates an out-of-focus state.

* * * * *